F. O. WOODLAND, DEC'D.
F. S. WOODLAND & A. F. KELLEY, ADMINISTRATORS.
WIPER MECHANISM FOR LABELING MACHINES.
APPLICATION FILED OCT. 4, 1916.
1,239,858.
Patented Sept. 11, 1917.
3 SHEETS—SHEET 1.
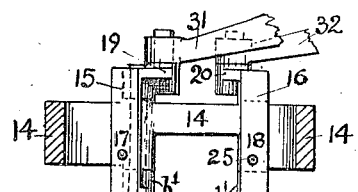
Fig. 2.
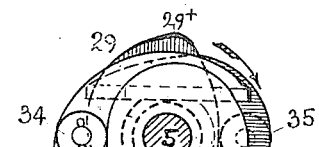
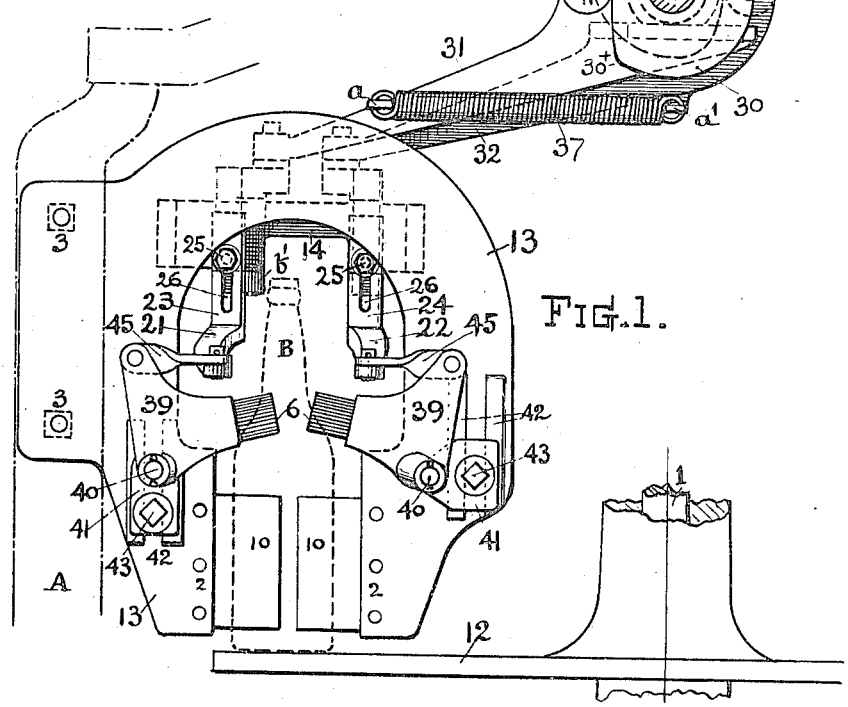
Fig. 1.
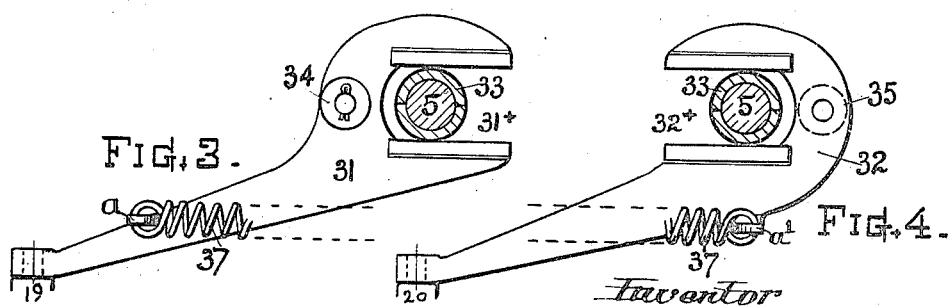
Fig. 3.                Fig. 4.
Inventor
Frank O. Woodland, Dec'd,
by F. S. Woodland and
A. F. Kelley, Administrators,
by Chas. H. Burleigh
Attorney

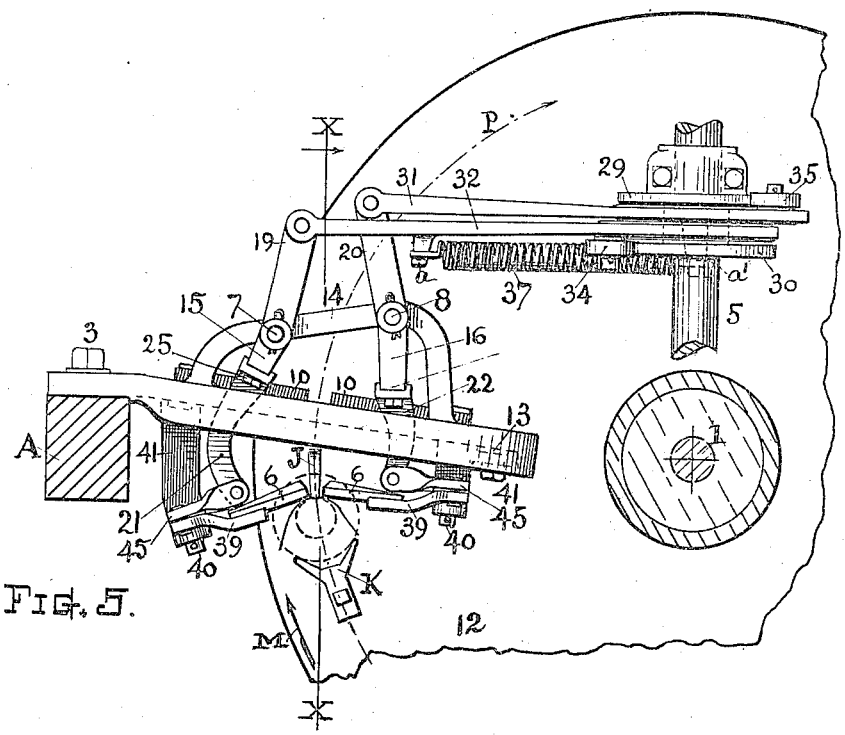
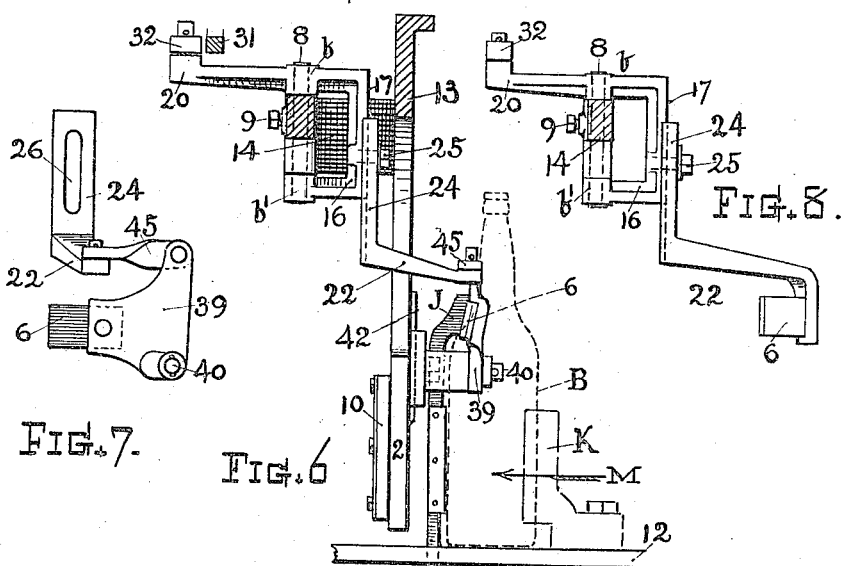

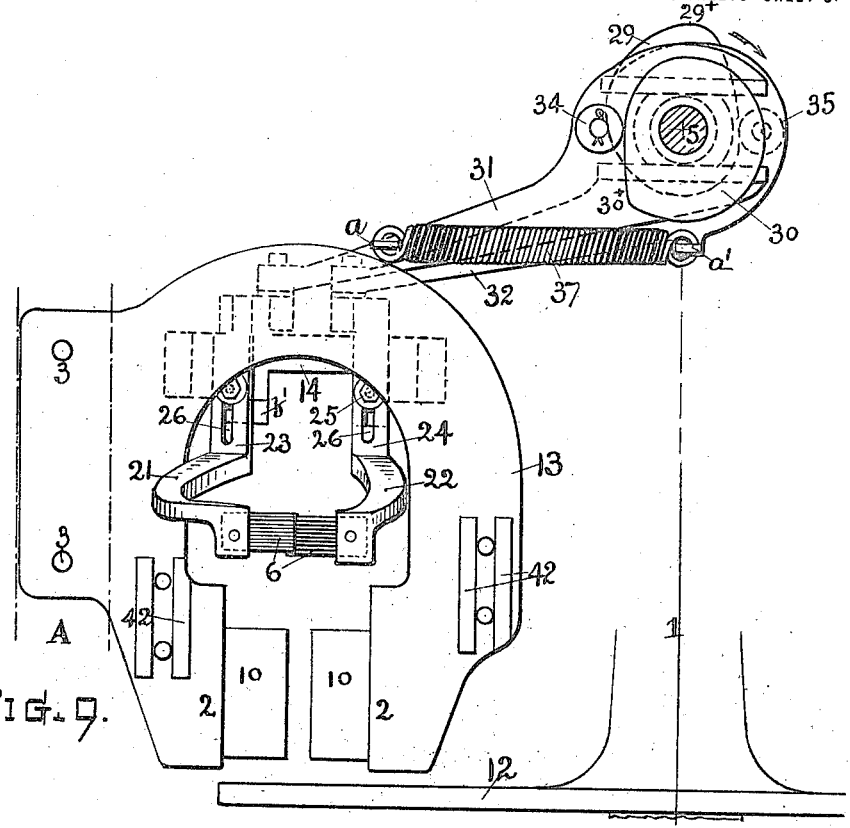
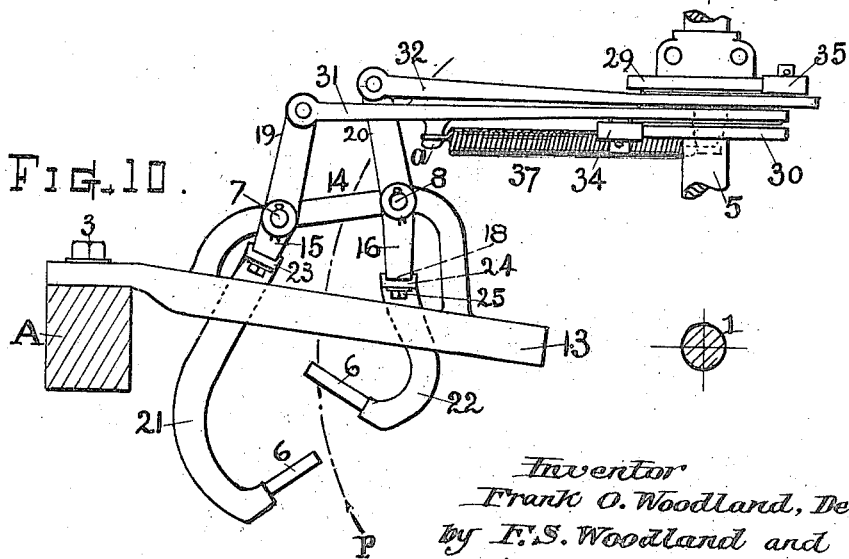

UNITED STATES PATENT OFFICE.

FRANK O. WOODLAND, DECEASED, LATE OF WORCESTER, MASSACHUSETTS, BY FRANCES S. WOODLAND, OF WORCESTER, MASSACHUSETTS, AND ARTHUR F. KELLEY, OF GRAFTON, MASSACHUSETTS, ADMINISTRATORS OF SAID FRANK O. WOODLAND, DECEASED, ASSIGNORS TO ECONOMIC MACHINERY COMPANY, OF WORCESTER, MASSACHUSETTS, A CORPORATION OF MASSACHUSETTS.

WIPER MECHANISM FOR LABELING-MACHINES.

1,239,858.      Specification of Letters Patent.      Patented Sept. 11, 1917.

Application filed October 4, 1916. Serial No. 123,759.

*To all whom it may concern:*

Be it known that FRANK O. WOODLAND, late a citizen of the United States and resident of Worcester in the county of Worcester and State of Massachusetts, invented certain new and useful Improvements in Wiper Mechanism for Labeling-Machines, of which the following is a specification.

The present invention relates to a novel construction and organization of the wiper-supports and wiper-actuating means, in a wiper mechanism adapted for employment in rotary or continuously operating labeling machines for bottles or the like; the improvement being more especially with reference to the mounting, adjustment and operation of the neck-label wipers. The objects of the invention are to render the mechanism simple and efficient for use; convenient for adjustment and practically applicable for interchangeable employment of either directly round-about wipers, or obliquely acting wipers, as more fully hereinafter explained.

Another object is to provide a wiper mechanism adapted for variable wiping, or to impart an impulse or increased pressure at the end of the wiping-on action, thereby laying the extreme ends of the label more firmly upon the surface to which they are affixed, and thus insuring more perfect adhesion thereof under high speed action, and requiring a thinner coating of glue.

The improved mechanism involving the present invention is adapted for use in labeling machinery of the general character described in Letters Patent No. 1,133,602, heretofore granted, and to which reference may be had for a fuller understanding of the complete operation of such machines in the feeding of bottles, gluing and delivery of labels, and effective action of such parts of the labeling machine as are not included as features of my present invention, and are therefore not shown in this application.

In the accompanying drawings, three sheets, Figure 1 represents a front elevation view of the improved wiper-mechanism, the neck-label wipers being shown as arranged for oblique wiping on the shoulder of a bottle; the operating shaft being shown in section. Fig. 2 is a sectional front view of the fulcrum-supporting bridge upon the back of the arch plate. Figs. 3 and 4 are separate views of the respective connection bars, with jaws embracing the shaft or cam hub. Fig. 5 represents a top plan view of the wiper-mechanism as furnished with obliquely acting wiper devices. Fig. 6 is a vertical section of the same at line X X on Fig. 5 looking in the direction of the arrow upon the upper end of said line. Fig. 7 is a detached front view of one of the neck-label wipers as made for oblique wiping action. Fig. 8 is a side elevation view of one of the wiper-carrier elements and wiper devices as made for round-about or circumferential wiping action. Fig. 9 represents a front elevation view of the mechanism with neck-label wipers arranged for direct round-about action, and Fig. 10 is a plan view of the same construction.

On the drawings, the part 12 represents a horizontally rotary table or carrier upon which the bottles or the like are supported in upright order, and advanced between the wiper devices; the glue-coated labels having been previously delivered to the bottles and centrally gripped thereto in the manner heretofore practised.

The construction and arrangement of mechanism for holding a supply of labels; for gluing and picking out the labels and delivering them to the advancing bottle; for centrally gripping the labels to the surface thereof; and for imparting motion to the several parts in their established order, may be assumed as being and operating substantially as set forth in Patent No. 1,133,602, or in any approved suitable construction. Such parts, while essential to a complete labeling machine, are not the subject of the present invention and therefore are not herein shown.

Numeral 1 indicates the central upright shaft on which the carrier 12 revolves; and 5 indicates the rotating operating shaft disposed in horizontal relation above the carrier and, in practice, connected therewith by suitable gearing (not shown) to rotate at constant pre-determined ratio.

The improved mechanism includes an upright furcated frame or arch-plate 13 having means, as the side flange and bolts 3, for its attachment to the upright member A of the machine frame, in position to transversely straddle the path of the advancing bottles, (indicated by the line P on Figs. 5 and 10) said arch-plate forming a wiper-supporting compound or bracket overhanging the bottle-carrier 12. At the lower part of the arch-plate its opposite limbs are extended inward, as at 2, and form seats for the body-label wipers 10, which preferably consist of rubber plates secured at one edge to said seats by screws or other efficient fastenings; their free edges adapted to flexibly wipe against the labels as the bottles or articles are passed between them.

6 indicates the neck-wiping pads of similar rubber material, and mounted to have a variable pressure action as follows: 14 indicates a projecting support, bridge or bearing member rigidly fixed upon the upper part of the arch 13, and having pivot bearings thereon. 15 and 16 indicate a pair of right and left laterally swinging wiper-carrier elements or levers, severally constructed with upper and lower bearing hubs $b$ $b^1$ at such distance apart as will fittingly embrace the upper and lower ends of the pivot-bearings on the bridge 14, whereon said wiper-carrier elements are respectively fulcrumed by upright pivot-studs or pins 7 and 8 that extend through the parts and are retained therein by a set-screw 9 as indicated, or by other efficient fastening. The wiper-carrier elements 15 and 16 are preferably of an approximately rectangular shape, each being formed with forwardly projecting upper and lower arms united by a vertical body portion having a seat-face, as 17 and 18, extending from top to bottom thereof, and parallel edges as illustrated; also each provided with a rearwardly projecting arm 19 and 20, to which the wiper-actuating means is connected.

The neck-label wipers are connected with the respective wiper-carrier elements 15 and 16 by wiper-arms 21 and 22, which are provided with offset heads 23 and 24 having seating faces grooved or flanged to countermatch the vertical seat-faces 17 and 18 and edges of the respective wiper-carrier elements, to which the respective arms are adjustably and detachably secured, each by a clamp screw 25 that passes through a slot 26 in the seating head and clamps the seat-faces in rigid contact at any position of their relative adjustment. The wiper-arms project through the opening of the arch-plate toward the approaching bottles. The wiper-arms can be conveniently adjusted to higher or lower positions upon the carrier elements; also can be readily released therefrom and interchanged for similarly attached arms and wipers of other forms or size at any time desired, as may be required for different styles of labels or bottles.

Upon the operating shaft 5 there are fixed two cams 29 and 30 that rotate with the shaft, and preferably have a hub 33 common to both. Between the cams is arranged a pair of direct connecting bars 31 and 32, of the character illustrated in Figs. 3 and 4, the head of one of said bars, 31, being formed with an outwardly open jaw 31+ for guiding upon the hub 33 of the cams, and provided with a stud-roller 34 that runs against the face of the cam 30; the other bar, 32, being formed with an inwardly open jaw 32+ for guiding upon the hub of the cams and provided with a stud-roller 35 that runs against the face of the cam 29. The outer ends of the bars 31 and 32 are respectively pivotedly connected to the extended arms 19 and 20 of the wiper-carrier elements 15 and 16, so that endwise movement of said bars swings the wiper-devices in accordance with the movement thereof.

A pull spring 37 is strained from a stay $a$ fixed upon one of the bars 31 to a stay $a^1$ upon the other bar 32. The force of the spring thus arranged acts simultaneously upon both connection-bars to move them in endwise opposite direction to each other; and for keeping their respective stud-rollers 34 and 35 against the faces of the cams, and to retract the wipers as the engaged faces of the cams recede. Also, by this arrangement of mechanism an approximately equipollent pressure is given the oppositely movable wipers, while the degree of pressure is readily variable while laying the label, or for imparting an impulse of increased pressure on the wipers as they smooth down the extremities of the label; thus effecting a more efficient affixing and adhering action; while a thinner quality, quantity or coating than usual of gum or glue may be employed with practical success. This construction also conduces to the free and smooth running of the mechanism, and permits of different shapes of cams, 29 and 30, being employed upon the shaft, by simple exchange of cams without modification of the connection devices. These cams are best made with a split hub 33 so as to be conveniently clamped upon the shaft.

The wiper actuating means, in the present instance, is furnished with points or swells 29+ and 30+ upon the cams 29 and 30 for giving the finishing impulse of increased pressure on the wipers, while in contact with the extreme ends of the labels, to effect a more efficient securement of the labels, and make a more perfect closure of their lapped edges in instances where overlapped labels are used; but such pressure impulse may be attained by other formed devices.

The neck-label wipers may be arranged either for oblique wiping action, or for direct, round-about, or circumferential wiping action, accordingly as angular-winged or straight-winged neck labels are to be affixed thereby. The wiper carrier elements 15 and and 16 and wiper-arms 21 and 22 are connected in the same manner, and have similar movements in either case.

For effecting oblique wiping the neck-label wiper pads 6 are respectively mounted upon rockable members 39, pivotally fulcrumed as at 40 upon support blocks 41 that are detachably secured to the arch-plate 13 by bolts 43, and upper ears of said rocker members are flexibly united to the wiper-arms 21 and 22 by pivotally connected links 45 as illustrated in Figs. 1, 5 and 6. The arch-plate is provided with ribbed seats 42 and openings to facilitate securing the support blocks at higher or lower position thereon, and the wiper-arms can be placed at higher or lower position by adjustment upon the face of the wiper carrier elements 15 and 16.

For round-about or direct circumferential wiping the wiper-pads 6 may be fixed directly upon the ends of the wiper-arms 21 and 22, as illustrated in Figs. 7, 9 and 10.

The grip device J, for temporarily clamping the labels central against the bottle B, and the bottle-pushing rest K can be arranged to operate as heretofore employed. The bottles, after having the labels delivered thereto, are carried beneath the arch-plate and pushed between the pairs of wipers in the direction indicated by the arrow M. (See Figs. 5 and 6.) As the end portions of the neck labels come under the wipers the mechanism causes an inward impulse of increased pressure thereon, the effect of which is to more efficiently fix the adhesion of the label without using an excessive pressure along the intermediate portion of the label; thus making the operation easier and attaining better results.

What is claimed and desired to be secured by Letters Patent is:

1. In a labeling machine for bottles or the like, in combination with means for advancing the bottles, oppositely acting neck-label wipers, and a wiper-supporting frame; a pair of pivotally supported wiper-carrier elements mounted on said frame, means connecting the wiper-devices with the respective wiper-carrier elements, and mechanism for operating said wiper-carrier elements and parts connected therewith, said mechanism including means for imparting to the wipers an impulse of increased pressure when said wipers are upon the extreme ends of the label, substantially as set forth.

2. In a labeling machine, in combination with means for carrying forward the bottle and label; a stationary fulcrum-supporting bridge adjacently above the path of the bottles, a label wiper, wiper actuating means including a carrier having fulcrum bearings embracing said bridge, and a front seating surface, a wiper-connecting arm having an upwardly offset attaching-head matching with said seating surface, means adjustably securing said head thereon, an upright fulcrum pivot hingingly connecting the carrier bearings and supporting bridge, mechanism for oscillating said carrier including means for imparting a variable and increasing pressure to the wipers while wiping-on the labels.

3. In a mechanism of the class described, a pair of right and left wipers, movable mountings carrying said wipers, means for passing bottles or the like successively between said wipers, connections for moving the respective wipers, and an actuating means therefor comprising a pair of pivotally attached endwise movable connection bars having oppositely disposed guiding jaws and roller-studs at their heads, a longitudinally arranged pull-spring connecting said bars, an operating shaft extending transversely through said jaws, and a pair of cams mounted upon said shaft and acting against the roller-studs of the respective connection-bars; said cams adapted for controlling the movement of the wipers in approximate conformity with the surface of the bottle, and provided with means for effecting an increased pressure impulse of the wipers upon the end portions of the label.

4. A label wiper mechanism, including a pair of swinging lever elements, a support upon which said lever elements are fulcrumed, right and left wiper devices connected with the respective lever elements, an operating shaft having a pair of cams adjacently fixed thereon, a pair of endwise reciprocating connecting bars, their ends pivotally connected with the rearwardly projecting members of said lever elements, said bars extending directly to said cams; their heads being respectively provided with means for engagement with an actuation by said cams, and a longitudinally disposed retracting spring attached to said bars, substantially as set forth.

5. A wiper mechanism of the character described, including an inverted U-shaped supporting plate having a fulcrum-bearing bridge fixed thereon, laterally swinging lever elements pivotally fulcrumed upon said bridge, and having projecting wiper connecting arms detachably secured thereto, rocking wiper devices carried upon said supporting plate and flexibly connected on said arms, a pair of endwise movable connecting bars their ends connected with the rearwardly projecting members of said lever elements, an operating shaft having suitable cams fixed thereon; said connecting bars extending direct and in an approximately parallel relation to said cams, and having their heads provided with guiding jaws, and means for engagement and actuation by said cams, and a retracting spring for moving the parts in opposition to the action of the cams.

6. A wiper mechanism comprising an inverted U-shaped supporting frame, body-label wipers supported thereon, wiper-carrier elements fulcrumed upon said frame, neck-label wipers connected with said wiper-carrier elements, an operating shaft provided with cams fixed thereon, endwise movable connection bars having oppositely open jaws embracing the cam-center hub as a guide, and respectively provided with stud-rolls that engage the cams, the opposite ends of said bars being connected with the respective wiper-carrier elements, and a spring connected from one of said bars to the other.

7. In a mechanism for the purpose described, the combination, with the rotary bottle carrier and operating shaft, an arch-plate spanning the path in which the bottles are carried; laterally swinging wiper-carrier elements, each comprising an upright seat-face, a rearwardly projecting member and fulcrum bearings pivotally supported upon said arch-plate, wiper-arm having offset heads that counter-match with, and are adjustably secured to the seat-faces on said wiper-carrier elements, wiper devices connected with the outer ends of said arms, a pair of cams fixed upon the operating shaft, reciprocating-bars pivotally connected with the rearward members of said wiper-carrier elements, and actuated by said cams, and a retracting spring connected to act in opposition to said cams.

8. In a mechanism of the character specified, an open-centered frame or arch-plate having facilities for the attachment of support-blocks thereto and provided with a projecting bridge member having pivot-bearings thereon, laterally swinging wiper-carrier elements having upper and lower hubs positioned to embrace the ends of said pivot-bearings, and provided with faces for seating the wiper-arms thereon, pivot-pins arranged through said bearings and hubs, means securing said pivot-pins; in combination with wiper-devices, wiper-arms that connect said wiper-device with said wiper-carrier elements, and means for operating said laterally swinging wiper-carrier elements.

In testimony whereof we have hereunto set our hands this third day of October, 1916.

FRANCES S. WOODLAND,
ARTHUR F. KELLEY,

*Administrators of Frank O. Woodland, deceased.*

Copies of this patent may be obtained for five cents each, by addressing the "Commissioner of Patents, Washington, D. C."